US012272201B2

(12) United States Patent
Coatney

(10) Patent No.: US 12,272,201 B2
(45) Date of Patent: Apr. 8, 2025

(54) MEDICATION DISPENSING SYSTEMS AND METHODS

(71) Applicant: Barbara Coatney, Waveland, MS (US)

(72) Inventor: Barbara Coatney, Waveland, MS (US)

( * ) Notice: Subject to any disclaimer, the term of this patent is extended or adjusted under 35 U.S.C. 154(b) by 0 days.

(21) Appl. No.: 17/501,439

(22) Filed: Oct. 14, 2021

(65) Prior Publication Data

US 2022/0392295 A1 Dec. 8, 2022

Related U.S. Application Data

(60) Provisional application No. 63/091,475, filed on Oct. 14, 2020.

(51) Int. Cl.
*G07F 11/10* (2006.01)
*G07F 17/00* (2006.01)

(52) U.S. Cl.
CPC .......... *G07F 11/10* (2013.01); *G07F 17/0092* (2013.01)

(58) Field of Classification Search
CPC .......... G07F 11/06; G07F 11/50; G07F 11/48; G07F 11/24; G07F 11/10; G07F 17/0092
USPC ..... 221/1, 92, 288, 277, 116, 115, 198, 281, 221/301, 133
See application file for complete search history.

(56) References Cited

U.S. PATENT DOCUMENTS 1,383,623 A * 7/1921 Groves .................. B65B 5/103 53/244
3,464,589 A * 9/1969 Oden ...................... G07F 11/32 221/295
4,142,863 A * 3/1979 Covington ....... G01N 35/00029 221/230

(Continued)

FOREIGN PATENT DOCUMENTS

DE 3306399 A1 11/1984
KR 20190137379 A * 12/2019 ............ B65D 41/04

OTHER PUBLICATIONS https://www.patbase.com/getimg/minestf_translate.asp?lp=de_en&url=https://www.patbase.com/gifchart/rad5FE15.tmp523389392_1.htm, pp. 1-7.

*Primary Examiner* — Rakesh Kumar
(74) *Attorney, Agent, or Firm* — Dennen 1P Law, LLC

(57) ABSTRACT

A system of the present disclosure has a housing that has at least one vertical channel for housing a plurality of medicine bottles laterally stacked in the channel, the channel has a first gate positioned above a trough and positioned such that when open, the first gate is beneath a first of the plurality of medicine bottles. Further, the channel has a second gate positioned above the first gate and positioned such that when open, the second gate is beneath a second of the plurality of medicine bottles, the second of the plurality of medicine bottles atop the first of the plurality of medicine bottles. The housing further comprising a trough for catching falling medicine bottles. The system further has a processor that sends a signal to a first servo motor coupled to the first gate at a predetermined time, the servo motor opening the first gate and allowing the first of the plurality of medicine bottles to fall into the trough. The processor further sends a signal to a second servo motor coupled to the second gate, the second servo motor opening the second gate and allowing the second of the plurality of medicine bottles to fall into a position where the first of the plurality of medicine bottles was held before the first of the plurality of medicine bottles fell into the trough.

7 Claims, 7 Drawing Sheets

(56) References Cited

U.S. PATENT DOCUMENTS 4,377,368 A * 3/1983 Koch ................. B65G 47/8815 414/746.4
4,542,834 A * 9/1985 Kurosawa ............. G07F 11/163 221/116
4,565,300 A * 1/1986 Kokubun ................ G07F 11/10 221/124
4,574,980 A * 3/1986 Kurosawa ............... G07F 11/24 221/116
4,673,105 A * 6/1987 Kurosawa ............... G07F 11/06 221/281
4,677,283 A * 6/1987 Lewis ....................... A61J 7/02 198/383
4,776,487 A * 10/1988 Kurosawa ............... G07F 11/24 221/21
4,854,477 A * 8/1989 Kurosawa ............... G07F 11/10 221/116
5,011,032 A * 4/1991 Rollman ................... A61J 7/04 116/323
RE33,668 E * 8/1991 Gray ....................... E05F 15/43 250/221
5,080,552 A * 1/1992 Takahashi ........... B29C 45/1808 414/416.01
5,159,581 A 10/1992 Agans
5,224,659 A * 7/1993 Gabardi ................ B02C 17/205 241/34
5,445,296 A * 8/1995 Insausti ................... G07F 11/06 221/298
5,651,476 A * 7/1997 Percy ...................... G07F 11/04 221/133
5,671,262 A * 9/1997 Boyer ................... G06M 1/101 377/6
5,791,516 A * 8/1998 Wittern, Jr. ............. G07F 11/04 221/116
5,799,824 A * 9/1998 Gasiel ..................... G07F 11/04 221/116
5,927,539 A * 7/1999 Truitt ...................... G07F 9/026 221/194
6,568,151 B2 * 5/2003 Buckley ................. B65G 15/58 198/803.14
6,629,625 B1 * 10/2003 Paczkowski .............. G07F 9/02 221/21
6,758,370 B2 * 7/2004 Cooke ..................... G07F 11/06 221/289
6,902,084 B2 * 6/2005 Bauman .................... A47F 1/10 221/115
7,286,901 B2 * 10/2007 Whitten .................. G07F 11/36 221/21
7,431,176 B2 * 10/2008 Bauman .................... A47F 1/10 221/133
7,882,980 B1 * 2/2011 Horn ....................... G07F 11/14 221/221
8,393,495 B2 * 3/2013 Kim ....................... B65G 27/02 221/12
8,983,656 B1 * 3/2015 Sternowski ............. G07F 9/026 700/244
9,211,233 B2 * 12/2015 Shavelsky ................. A61J 7/04
9,311,452 B2 4/2016 Dickie et al.
9,520,013 B2 * 12/2016 Erikawa .............. G07F 17/0014
9,839,583 B2 * 12/2017 Kim ...................... A61J 7/0069
10,052,260 B2 8/2018 Omura et al.
10,406,074 B1 9/2019 Mazur
10,391,027 B1 10/2019 Pande
10,968,001 B2 * 4/2021 Van Der Meij ....... B65B 39/007
2014/0175116 A1 * 6/2014 Chen ....................... G07F 11/48 221/277
2016/0180630 A1 * 6/2016 Makino ................... G07F 11/24 221/133
2022/0392295 A1 * 12/2022 Coatney .............. G07F 17/0092

* cited by examiner

MEDICATION DISPENSING SYSTEMS AND METHODS

CROSS REFERENCE TO RELATED APPLICATION

This application claims priority to U.S. Provisional Patent Application Ser. No. 63/091,475 entitled Medicine Dispensing Systems and Methods and filed on Oct. 14, 2021, which is incorporated herein by reference.

BACKGROUND

According to the National Federation of the Blind, roughly 7,675,600 reported having a visual disability in 2016, (National Federation of the Blind, 2016). One of the main concerns for individuals who have low vision is not receiving proper medication due to medication errors, for example administering the improper dosage of a critical medication or consuming the wrong drug entirely. These medication errors lead to increased health problems and in some instances, can be fatal. One major implication of medication errors is the incidence of adverse drug events. Individuals who take more medication, such as elderly persons 65 and older and people with chronic health conditions are more susceptible to adverse drug events. Adverse Drug Events (ADE) for aging seniors and more than 450,000 emergency room visits each year. Nearly 120,000 must be hospitalized for further treatment after emergency visit for adverse drug event. To reduce the risk of harm from adverse events of the five recommendations is to take all medicines only as directed.

Medication administration errors and mortality rate is of great concern for the aging and disabled population. In a study in from 2007-2016 it was found that errors were most often reported (66.4%) was for patients who were 75 years of age or older. The most common error category was omitted medicine or ingredients. It also was found that to prevent these more serious errors, interventions should focus on avoiding dose omissions and correct administration of these drugs.

The purpose of medication is to relieve pain and improve the quality of life for millions of Americans; however, in 2014, roughly 16,000 Americans died of unintentional overdose of pain medicines (See Figure A). This number nearly continued to increase in 2015, to roughly 17,000 and is estimated to continue to increase if conditions remain the same (National Institute of Drug Abuse, 2016). While there are many factors that contribute to the drug overdose epidemic, the primary component is medication error—both intentional and unintentional.

Furthermore, physicians and pharmacist play a passive role in their tendency to assume that patients can read, understand, and act on brief instruction found on prescription medication labels. This problem is amplified significantly for people who are disable, aging, low vision, or legal blind.

FIG. 1 is a graph that shows the number of deaths from prescription pain relievers. The graph shows gradual increase between 2002-2015.

According to the report for the 2015 National Health Interview Survey, 23.7 million American Adults aged 18 and older reported experiencing vision loss (American Foundation of the Blind). Vision loss can have severe adverse effects on the overall health and wellbeing of older adults. The American Foundation of the Blind (AFB) characterizes vision loss as, "individuals who reported that they have trouble seeing, even when wearing glasses or contact lenses, as well as to individuals who reported that they are blind or unable to see at all" (American Foundation of the Blind). Two major effects of vision loss are increased risk of depression and difficulty identifying medication. This ultimately can lead to drug related errors that adversely affect the patient's health. Additionally, some of the conditions of individuals with vision loss experience include macular degeneration, cataracts, diabetic retinopathy, and glaucoma, all of which require a regimented combination of medication to treat (National Eye Institute).

Perhaps one of the most critical points to emphasize is the fact that many aging senior citizens and blind individuals have difficulty or complete inability to care for themselves for various reasons. One of the main reasons being that navigating day-to-day activities, especially doctor's appointments, requires the assistance of caregivers since persons with vision impairment are more likely than those with other disabilities to report that physicians are hurrying them during medical encounters (Warren, Mary). Another major reason is the current model of medicine bottles combined with the complex medication regimens of individuals with vision loss, present a nearly impossible challenge for people who are disable, aging seniors or with vision disabilities to face alone. However, while caregivers are undoubtedly needed, the costs are high, and the availability of help does not meet the demand. It is estimated that the cost of care for blindness in 2010 was 2.3 trillion dollars and rising. What if there was a way to reduce this cost by reducing the need for caregivers? Imagine a medication system that provided this population with some autonomy and the independence to care for themselves!

BRIEF DESCRIPTION OF THE DRAWINGS

FIG. 9 is a bottom perspective view of the medicine bottle shown in

DETAILED DESCRIPTION

The present disclosure describes a medication dispensing system for individuals of all ages. The medication dispensing system improves the clarity and comprehensibility of administering medication. The medication system provides patients with an alternative way to take medication with fewer mistakes. In one embodiment, a caregiver may set-up medication once each week; order medication a week prior to being out; or make sure the medication dispensing system is in a convenient location and on time.

In one embodiment, the medicine bottles of the medication dispensing system are made from a hard plastic that is dishwasher safe for sanitation purposes and reusability. The bottles may contain bumps or raised areas of plastic that are present along the top of the bottles indicating a day of the week, and the bottles may contain bumps or raised areas of plastic that are present along the side of the bottles indicating a time of day, e.g., AM, noon, PM, or bedtime.

In one embodiment, the bottle top is a circle that measures 1-inch diameter and 1½ in width. Further, the bottle top may have a flip-top closure that is easy to open and close but may not be detachable. This will help prevent the dropping of pills, as well as prevent the patient from losing the top. The user can put the bottle up to his/her mouth, making sure that they get the pills in the mouth.

In one embodiment, each bottle is 4 inches in length. Lengthwise along the sides of the bottle are indents that make it easy to hold and distinguishes it from other pill bottles. There are four bottles exposed to the individual, and each bottle indicates morning, noon, nighttime, and bedtime medications. Each bump will be separated with a bulge in the plastic on top. Morning may have one bump, noon may have two bumps, evening may have three bumps, and bedtime may have four bumps. The bumps help the individual to ensure that he/she is taking the correct medication for the time of day.

Figure 2:
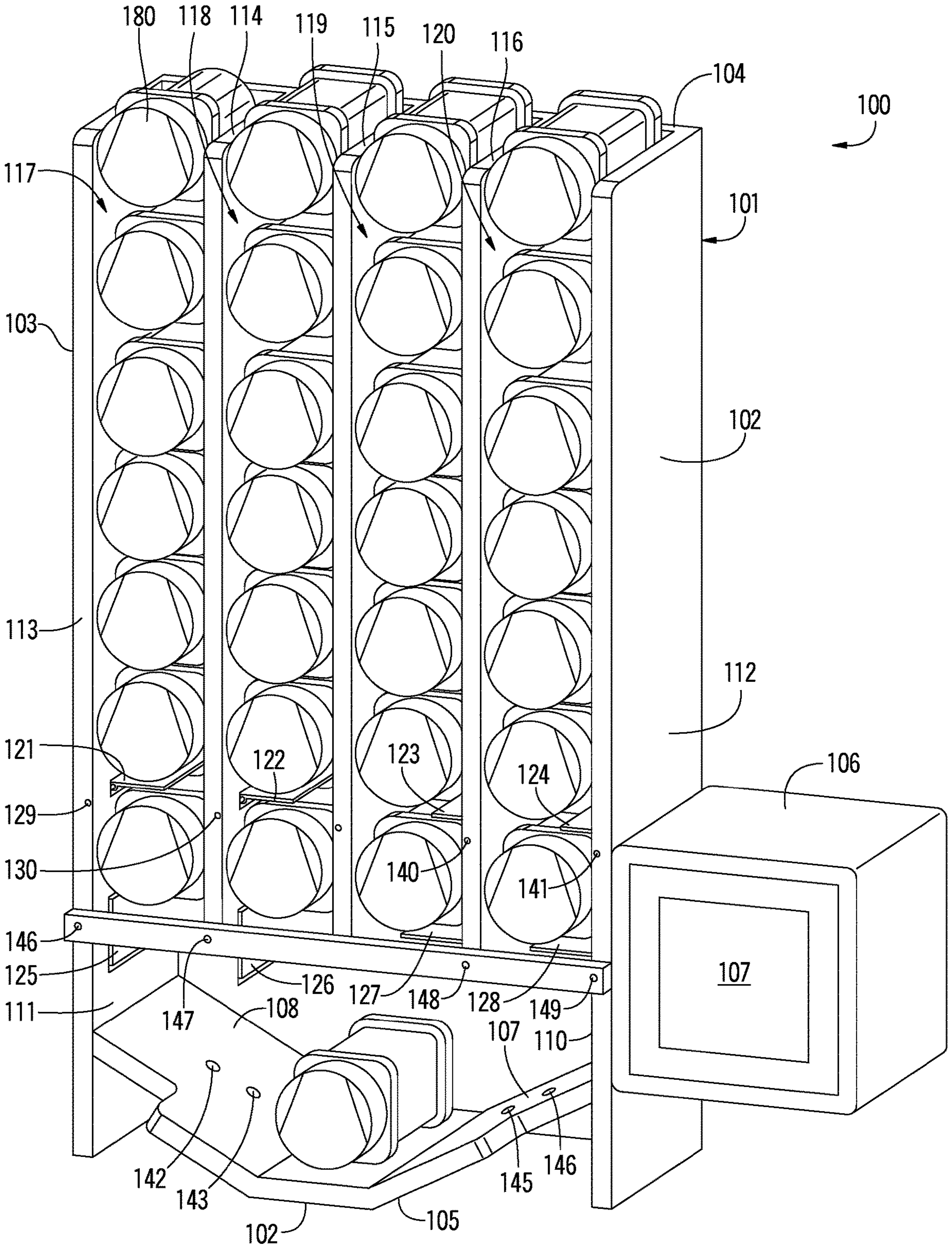
FIG. 2 is a perspective view of a medication dispensing system in accordance with an embodiment of the present disclosure.

FIG. 2 is a perspective view of a medicine dispensing system 100 in accordance with an embodiment of the present disclosure. The medicine dispensing system 100 is self-contained and comprises a housing 101. During use, the medicine dispensing system 100 mounts to a wall and gravity aids in dispensing medicine bottles as described below.

The housing 101 has a back side 104. Contiguous with the backside 104 at right angles are side walls, including a right side wall 102 and a left side wall 103.

Further, the medicine dispensing system 100 comprises a trough 105. The trough comprises an upwardly angled right section 107, a flat section 109, and an upwardly angled right section 108. The upwardly angled right section 107 couples to an inside surface 110 of the right side wall 102. The upwardly angled left section 108 couples to an inside surface 111 of the left side wall 103. The trough 105 is configured for catching medicine bottles, which is described further herein.

In one embodiment, the medicine dispensing system 100 comprises a controller 106. In such an embodiment, the controller 106 is coupled to an outside surface 112 of the right side wall 102. Note that the controller 106 could also be coupled to an outside surface 113 of the left side wall 103.

In addition, the medicine dispensing system 100 further comprises inner walls 114-116. Note that there are three inner walls 114-116. However, there could be fewer or more walls in other embodiments.

The right side wall 102, the left side wall 103, and the inner walls 114-116 form channels 117-120. In this regard, the left side wall 103 and the inner wall 114 form channel 117. Within the channel 117 a plurality of medicine bottles 180 are laterally inserted one atop the other. The inner wall 114 and the inner wall 115 form channel 118. Within channel 118 a plurality of medicine bottles 180 are laterally inserted one atop the other. The inner wall 115 and the inner wall 116 form channel 119. Within channel 119 a plurality of medicine bottles 180 are laterally inserted one atop the other. The inner wall 116 and the right outer wall 102 form channel 120. Within channel 120 a plurality of medicine bottles 180 are laterally inserted one atop the other.

The medicine dispensing system 100 further comprises gates 121-128. Each gate is moveable from a closed position, the gates 121-128 are horizontal, to an open position, the gates 121-128 are vertical to a closed position.

The first row of gates 125-128 are rotatably coupled to the left outside wall 103, the inner wall 114, the inner wall 116, and the right outer wall 102. The first row of gates 125-128 are positioned above a trough 105 and positioned such that when open they are beneath the first row of medicine bottles 180. The second row of gates 121-124 are rotatably coupled to the left outside wall 103, the inner wall 114, the inner wall 116, and the right outer wall 102. The second row of gates 121-123 are positioned above gates 125-128 and positioned such that when open they are above the medicine bottles 180 in the first row but beneath the second row of medicine bottles 180.

The gates 121-124 are coupled to axles 129, 130, 140, and 141. Each axle 129, 130, 140, and 141 extend through inner walls 114-116 and sides walls 102, 103. In this regard, axle 129 extends laterally through the left side wall 103, couples to the gate 121, extends out the back of the left side wall 103 and couples to a servo motor (not shown). The servo motor controls opening and closing of gate 121.

Axle 130 extends laterally through the inner wall 114, couples to the gate 122, extends out the back of the inner wall 114 and couples to a servo motor (not shown). The servo motor controls opening and closing of gate 122.

Axle 140 extends laterally through the inner wall 116, couples to the gate 123, extends out the back of the inner wall 116 and couples to a servo motor (not shown). The servo motor controls opening and closing of gate 123.

Axle 141 extends laterally through the right outer wall 102, couples to the gate 124, extends out the back of the right outer wall 102 and couples to a servo motor (not shown). The servo motor controls opening and closing of gate 124.

Note that the gates 121-124 described hereinabove control the downward movement of the second row of medicine bottles 180. In this regard, when the gates 121-124 are closed, in a horizontal position, the medicine bottles 180 remain stationary in the channels 117-120. However, when a servo motors actuates gates 121-124 thereby opening the gates, the gates are in a vertical position, the second row of medicine bottles 180 move downward to the position of the first row of medicine bottles 180.

The gates 125-128 are coupled to axles 146-149. Each axle 146-149 extends through inner walls 114 and 116 and sides walls 102, 103. In this regard, axle 146 extends laterally through the left side wall 103, couples to the gate 125, extends out the back of the left side wall 103 and couples to a servo motor (not shown). The servo motor controls opening and closing of gate 125.

Axle 147 extends laterally through the inner wall 114, couples to the gate 126, extends out the back of the inner wall 114 and couples to a servo motor (not shown). The servo motor controls opening and closing of gate 126.

Axle 148 extends laterally through the inner wall 116, couples to the gate 127, extends out the back of the inner wall 116 and couples to a servo motor (not shown). The servo motor controls opening and closing of gate 127.

Axle 149 extends laterally through the right outer wall 102, couples to the gate 128, extends out the back of the right outer wall 102 and couples to a servo motor (not shown). The servo motor controls opening and closing of gate 128.

Note that the gates 125-128 described hereinabove control the downward movement of the first row of medicine bottles 180. In this regard, when the gates 125-128 are closed, in a horizontal position, the medicine bottles 180 remain stationary in the channels 117-120. However, when a servo motor actuates gates 121-124 thereby opening the gates, the gates are in a vertical position, the second row of medicine bottles 121 move downward to the trough 105. Further note that only one bottle 180 from the first row of bottles should be dropped into the trough 105 at a time.

The medicine dispensing system 100 further comprises an infrared light 143 on the left angled section of the trough 105 and an infrared sensor 145 on the right angled section of the trough 105 in alignment with the infrared light 143. In this regard, if a medicine bottle 180 drops into the trough 105, a signal transmitted by the infrared sensor a signal is sent to a controller showing a change in detection. The signal indicates that a medicine bottle 180 has dropped into the trough 105. If the signal transmitted by the infrared sensor 145 does not change, the controller determines that a bottle has not dropped in the trough 105 and an error occurs.

Furthermore, the medicine dispensing system 100 further comprises an infrared light 142 further up on the left angled section of the trough 105 and an infrared sensor 144 further up on the right angled section of the trough 105 in alignment with the infrared light 142. In this regard, if a plurality of medicine bottles 180 inadvertently drop into the trough 105, a signal transmitted by the infrared sensor 144 sends a signal to the controller showing a change in detection. The signal indicates that a plurality of medicine bottles 180 have dropped into the trough 105 inadvertently. Thus, the controller determines that a too many medicine bottles have dropped in the trough 105 and an error occurs.

The controller 106 controls operation of the medicine dispensing system 100. In this regard, the controller comprises a timer. Based on the timer, the controller transmits a signal to one of the servo motors (not shown) to actuate a gate on the first row of medicine bottles 180. When actuated, the medicine bottle 180 drops into the trough, and based on the infrared sensor 145, the controller verifies that the bottle did drop into the trough 105. Further, so long as the signal from the infrared sensor 144 does not change, the controller 106 verifies that only one medicine bottle 180 dropped. The controller 106 then actuates the gate to the closed position.

Once a medicine bottle 180 has dropped, the controller actuates the servo motor corresponding to the gate 121-124 above the medicine bottle 180 that has dropped. Thus, the medicine bottle 180 above the medicine bottle that has dropped falls downwardly via gravity to the first row of medicine bottles 180.

This process continues throughout the day dropping the AM medicine bottle 180 at a predetermined time, the noon medicine bottle at a predetermined time, the evening medicine bottle at a predetermined time, and the bedtime medicine bottle at a predetermined time. Thus, throughout the day, a user is notified by the dropping of the medicine bottles 180 that it is time to take medicine. Once a day has completed, the medicine bottles 180 are lined up in row one of the medicine bottles 180 for the next day.

The controller 106 comprises an electronic timer (not shown). The timer activates and audio and/or visual indicator when it is time for the user to take his/her medication. In this regard, the controller 106 may comprise a liquid crystal display 170 for displaying information related to the user's medicine regimen. Also, the controller 106 may comprise a Wi-Fi transceiver, and when it is time for the user to take his/her medication, the Wi-Fi transceiver may transmit a signal to the user's handheld device, for example. In one embodiment, the audio and/or visual indicator will activate four times a day. The user sets the alarm when setting up the medication dispensing system 100 in the home through the LCD display 107.

As indicated above, the controller 106 may comprise Wi-Fi transmitter (not shown) or a Bluetooth transmitter (not shown). The Wi-Fi transmitter and Bluetooth transmitter are used to notify the user via text message, but not limited to IOS or android phones.

Note that there are seven rows of medicine bottles 180. There is one row for each day of the week. Further, there are four columns of medicine bottles 180. There is a row for each time of the day at which medicine is taken, e.g., AM, noon, nighttime, and bedtime. Therefore, there are 28 medicine bottles 180 total.

In one embodiment, the medicine bottles 180 are bright colors. The medicine bottles 180 can be, for example, red, green, orange, and yellow to indicate morning, noon, evening, and bedtime medication, respectively. Bright colors are generally the easiest to see, even for low vision individuals due to their ability to reflect light. Solid bright colors, such as red, green, orange, and yellow are detectable even to those that identify as legally blind.

The medication dispensing system 100 may be white but it is not limited. It may be other colors in other embodiments. Notably, the white color provides contrast to the bright colors of the medicine bottles 180. The medication dispensing system 100 can be made of wood or hard plastic. It can be placed in several locations, but the location need be consistent for the users.

In one embodiment light emitting diodes (LED) lights are placed in the medication dispensing system 100. The lights reflect light in the dark, and the user can easily find the medication.

The medication dispensing system 100 may comprise the LED Lights described above. The LED lights will come on when the room is dark. This will enable the user to find the medication dispensing system 100 in the dark if necessary.

The controller 106 may comprise a rechargeable battery (not shown).

Further, the controller 106 may comprise a battery back-up. The battery back-up will ensure that the timer continues to operate.

In addition, the medication dispensing system 100 comprises an electric receptacle (not shown). The electrical receptacle shall recharge the battery, and the electric receptacle will be used so that consumers can use rechargeable batteries.

Figure 3:
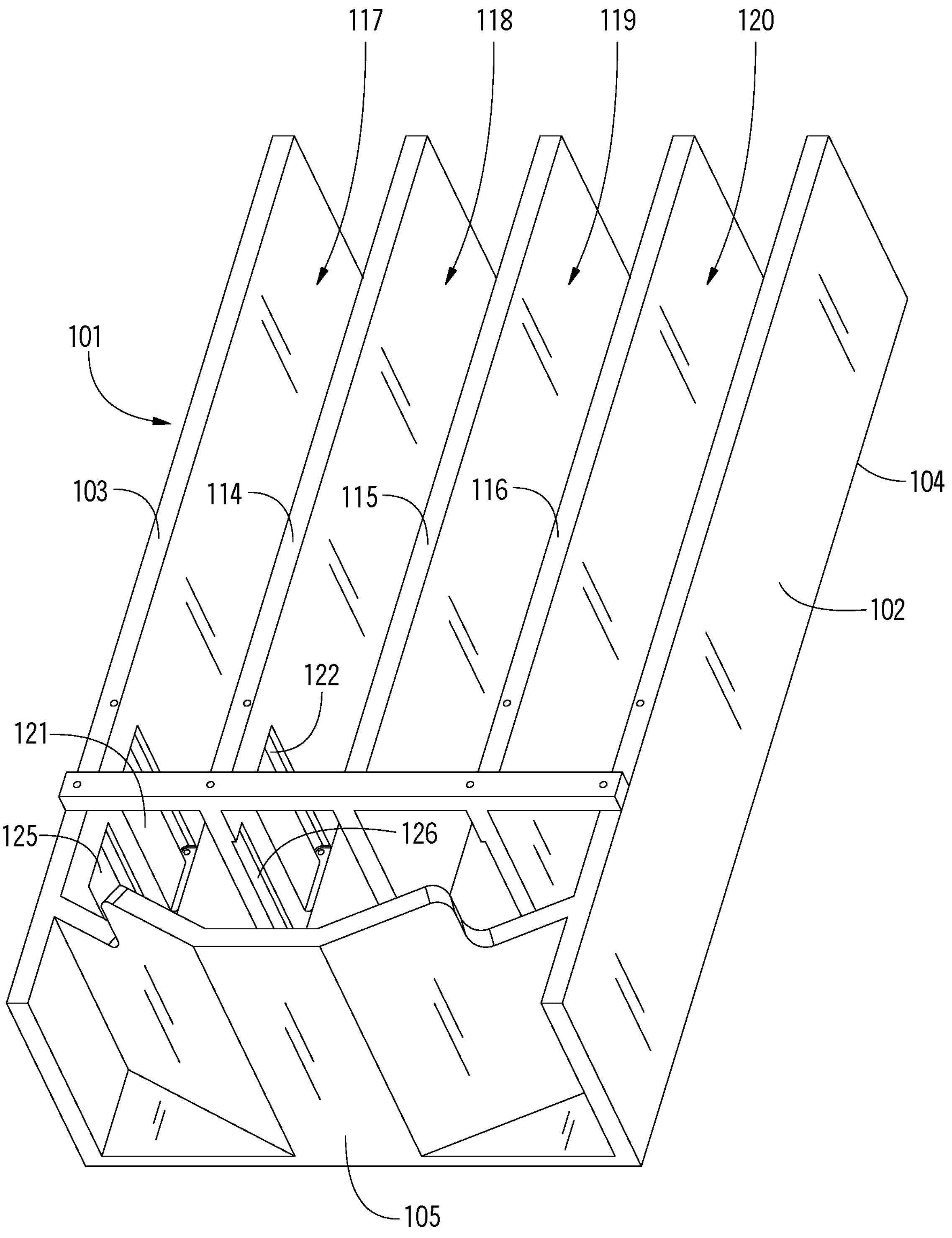
FIG. 3 is a perspective view of a housing of the medication dispensing system shown in FIG. 2.

FIG. 3 is a perspective view of the housing 101 without the medicine bottles 180 (FIG. 2). The housing is configured to contain 28 medicine bottles 180. That is, there is one medicine bottle for AM, noon, evening, and bedtime for each day of a seven day week.

The housing 101 comprises the back wall 104. Coupled to the back wall 104 is the right outer wall 102 and the left outer wall 103 that are coupled perpendicular to the back wall 104. The outer walls 102 and 103 are vertical, parallel walls.

Further, the housing comprises three inner walls 114-116 that are coupled to the back wall 104. The inner walls 114-116 are parallel with the right outer wall 102 and the left outer wall 103. Further, the inner walls 114-115 are perpendicularly coupled to the back wall 104.

The left outer wall 103 and the inner wall 114 form a channel 117 in which medicine bottles are inserted on their side with the lid facing forward. Seven rows of medicine bottles 180 may be inserted in channel 117.

The inner wall 114 and the inner wall 115 form a channel 118 in which medicine bottles 180 are inserted on their side with the lid facing forward. Seven rows of medicine bottles 180 may be inserted in channel 118.

The inner wall 115 and the inner wall 116 form a channel 119 in which medicine bottles 180 are inserted on their side with the lid facing forward. Seven rows of medicine bottles 180 may be inserted in channel 119.

The right outer wall 102 and the inner wall 116 form a channel 120 in which medicine bottles 180 are inserted on their side with the lid facing forward. Seven rows of medicine bottles 180 may be inserted in channel 120.

The housing 101 comprises a trough 105 integral with a bottom section of the medicine dispensing system 100. The trough 105 is situated below openings through which medicine bottles 180 may be released. Thus, the trough 105 catches a released medicine bottle 121 until a user takes possession of the dropped medicine bottle 180.

The housing 101 further has first row gates 125 and 126 and second row gates 121 and 122. When the gates 121, 122, 125, and 126 are in a holding position, i.e., the medicine bottles 121 cannot fall into the trough, the gates 121, 122, 125, and 126 are positioned horizontally beneath the first row of medicine bottles 121 and second row of medicine bottles 180. FIG. 3 shows the gates 121, 122, 125, and 126 in an open position, which allows medicine bottles 180 in the channels 117-120 to fall downward by the force of gravity.

In operation, all the gates 121, 122, 125, and 126 are in a closed positioned, i.e., horizontally situated to prevent the medicine bottles 180 from moving downward.

When it is time for AM medication to be dispensed, the controller 106 (FIG. 1) actuates gate 125 pivoting the gate upward to a vertical position. When the gate 125 pivots to a vertical position, the medicine bottle 180 in the first row of medicine bottles 180 falls via gravity into the trough 105.

Once the medicine bottle 180 has fallen, the controller 106 actuates gate 124 downward so that it is in the horizontal position. The controller 106 then actuates gate 121 holding the second medicine bottle 180 in the column of medicine bottles 180. The controller 106 actuates the gate 121 upward to a vertical position. When gate 121 pivots to a vertical position, the medicine bottle 180 in the second row of medicine bottles 180 falls via gravity to the column position previously occupied by the first medicine bottle in the column that has fallen into the trough.

When it is time for noon medication to be dispensed, the controller 106 (FIG. 1) actuates gate 126 pivoting the gate upward to a vertical position. When the gate 126 pivots to a vertical position, the medicine bottle 180 in the first row, second column of medicine bottles 80 falls via gravity into the trough 105.

Once the medicine bottle 180 has fallen, the controller 106 actuates gate 122 downward so that it is in the horizontal position. The controller 106 then actuates gate 122 holding the second medicine bottle 180 in the column of medicine bottles 180.

The controller 106 actuates the gate 122 upward to a vertical position. When gate 122 pivots to a vertical position, the medicine bottle 180 in the column two, second row of medicine bottles 180 falls via gravity to the column position previously occupied by the first medicine bottle in the column two that has fallen into the trough.

This process continues throughout the day for each of the four columns of medicine bottles 180. In this regard, night-time medicine bottle 180 in column 3, first row drops into the trough 105. Thereafter, the medicine bottle 180 in column 3, second row drops to the column position previously occupied by the medicine bottle 180 in column 3, row 1, which is the next day's medicine.

Also, bedtime medicine bottle 180 in column 4, first row drops into the trough 105. Thereafter, the medicine bottle 180 in column 4, second row drops to the column position previously occupied by the medicine bottle 180 in column 4, row 1, which is the next day's medicine.

Figure 4:
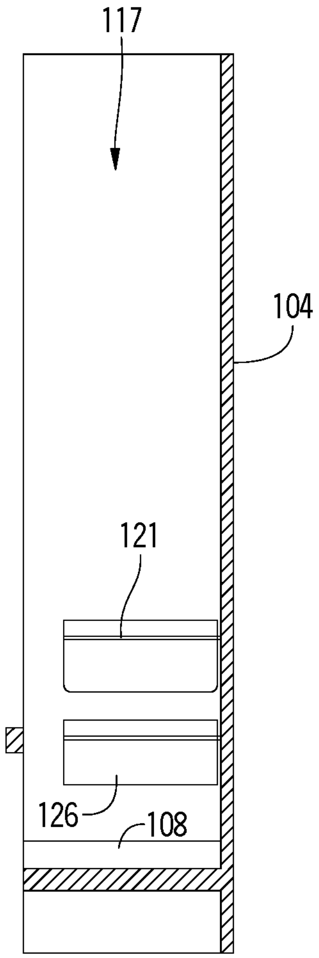
FIG. 4 is a side view of the housing of the medication dispensing system shown in FIG. 2.

FIG. 4 is a side view of the housing 101 as shown in FIG. 3. Notably, the housing comprises a back wall 104. Integral with the back wall 104 is a right side wall 102 that is perpendicular to the back wall 104. Further disclosed in FIG. 4 is the gate 128 that actuates to move medicine bottles 180 on the first row of the medicine bottles 180. Also, gate 141 actuates to move medicine bottles 121 on the second row of the medicine bottles 180.

Similarly, the left side wall 103 (FIG. 2) is integral with the back wall104. Further, the left side wall 103 is perpendicular to the back wall 104. The left side wall 103 has gates 121 (FIGS. 2) and 125 (125). Gate 125 actuates to move medicine bottles 180 on the first row of the medicine bottles 180. Also, gate 125 actuates to move medicine bottles 180 on the second row of the medicine bottles 180.

Figure 5:
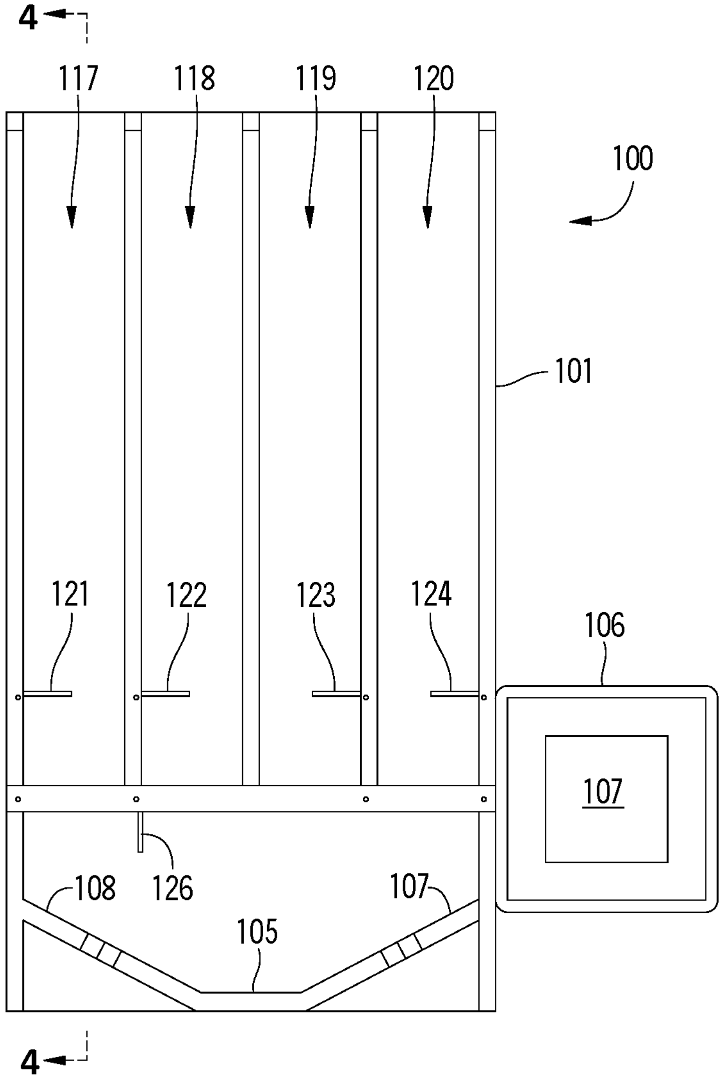
FIG. 5 is a front view of the housing of the medication dispensing system shown in FIG. 2.

FIG. 5 is a front view of the medicine dispensing system 100. The medicine dispensing system 100 comprises the housing 101 and a controller 106 with a touchscreen 150. The controller 106 is coupled to the housing 101.

The housing 101 comprises the channels 117-120 formed by left outer wall 103, inner walls 114-116 and right outer wall 102. The medicine bottles 180 (FIG. 1) are inserted in the channels 117-120.

There are two rows of gates. There is a row of gates 125 (FIG. 1), 126, 127 (FIGS. 1), and 128 (FIG. 1) that prevent the first row of medicine bottles falling in the trough 105. There is a row of gates 121-124 that prevent the second row of medicine bottles 180 from falling to the position of the first row of medicine bottles 180.

Figure 6:
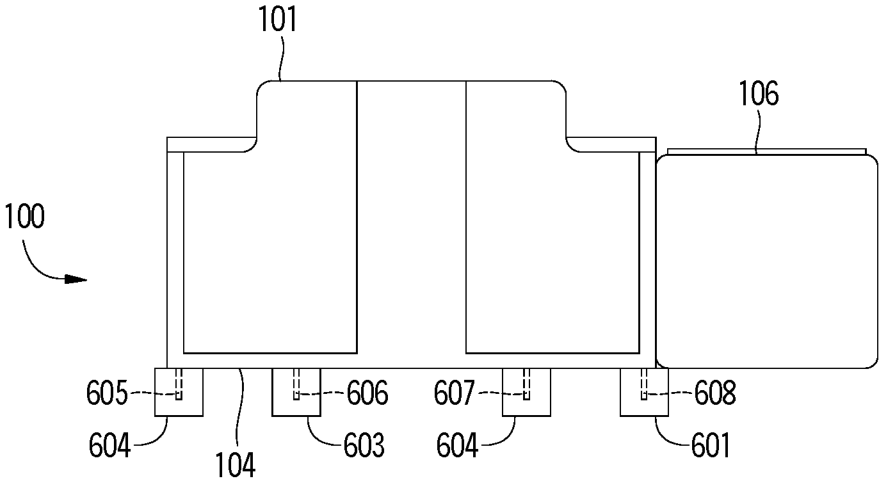
FIG. 6 is a bottom view of the housing of the medication dispensing system shown in FIG. 2.

FIG. 6 is a bottom view of the medicine dispensing system 100. The bottom view of the medicine dispensing system 100 shows the controller 106 coupled to the housing 101. On the back wall 104 there are a plurality of axles, one for each gate 121-124 and 126-127.

In this regard, there are axles 605-608. Each axle couples to a respective servo motor 604-601. The controller 106 is electrically coupled to the servo motors 604-601. In operation, the controller 106 transmits signals to the servo motors 604-601 to activate gates 121-124. Further, there are axles (not shown) that couple to servo motors for the first row of gates. Similarly, the controller 106 transmits signals to the servo motors to activate gates 125-127.

Figure 7:
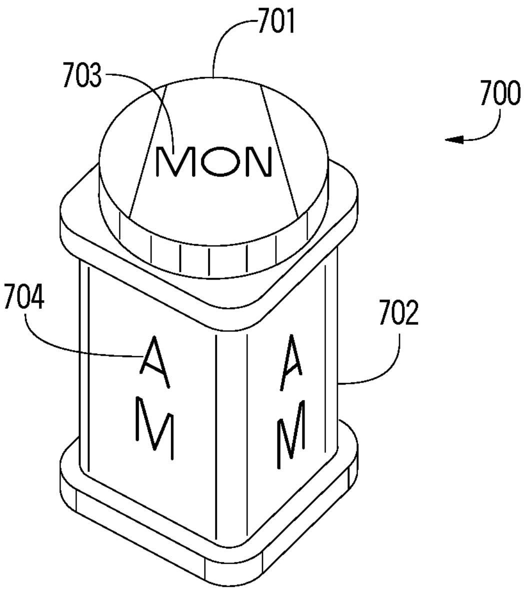
FIG. 7 is a perspective view of a medicine bottle of the medication dispensing system shown in FIG. 2.

FIG. 7 is an exemplary medicine bottle 700 in accordance with an embodiment of the present disclosure. The medicine bottle comprises a vacant tubular body 702 coupled to a lid 701. The day of the week 703 is formed on the lid in raised plastic, and the time of day 704 is on an outside surface of the vacant tubular body 702 in raised plastic.

Figure 8:
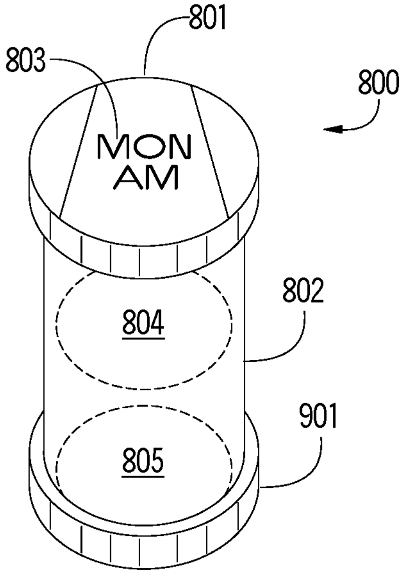
FIG. 8 is a top perspective view of a two-sided medicine bottle of the medication dispensing system shown in FIG. 2.

FIG. 8 is another exemplary medicine bottle 800 in accordance with an embodiment of the present disclosure. The medicine bottle 800 comprises a tubular body 702 that comprises two separate compartments 804 and 805. Thus, one type of medicine may be in the first compartment 804, and a different kind of medicine may be in the second compartment 805.

The medicine bottle 800 further comprises a first lid 801 that couples to the tubular body 802. The day of the week and the time of day 803 are formed on the lid 801 in raised plastic.

Figure 9:
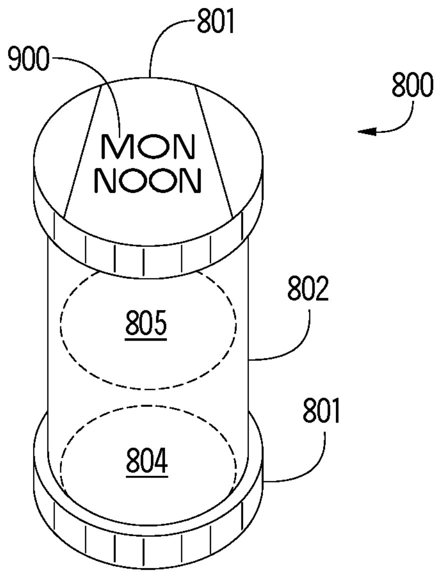

FIG. 9 is a bottom view of the exemplary medicine bottle 800. The medicine bottle 800 further comprises a second lid 901 that couples to an opposing end of the tubular body 802. The day of the week and the time of day 900 are formed on the lid 901 in raised plastic.

Thus, one medicine bottle 800 can be used for two separate times. Morning medicine may be placed in the first compartment 804. Further, noon medicine may be placed in the second compartment.

Figure 10:
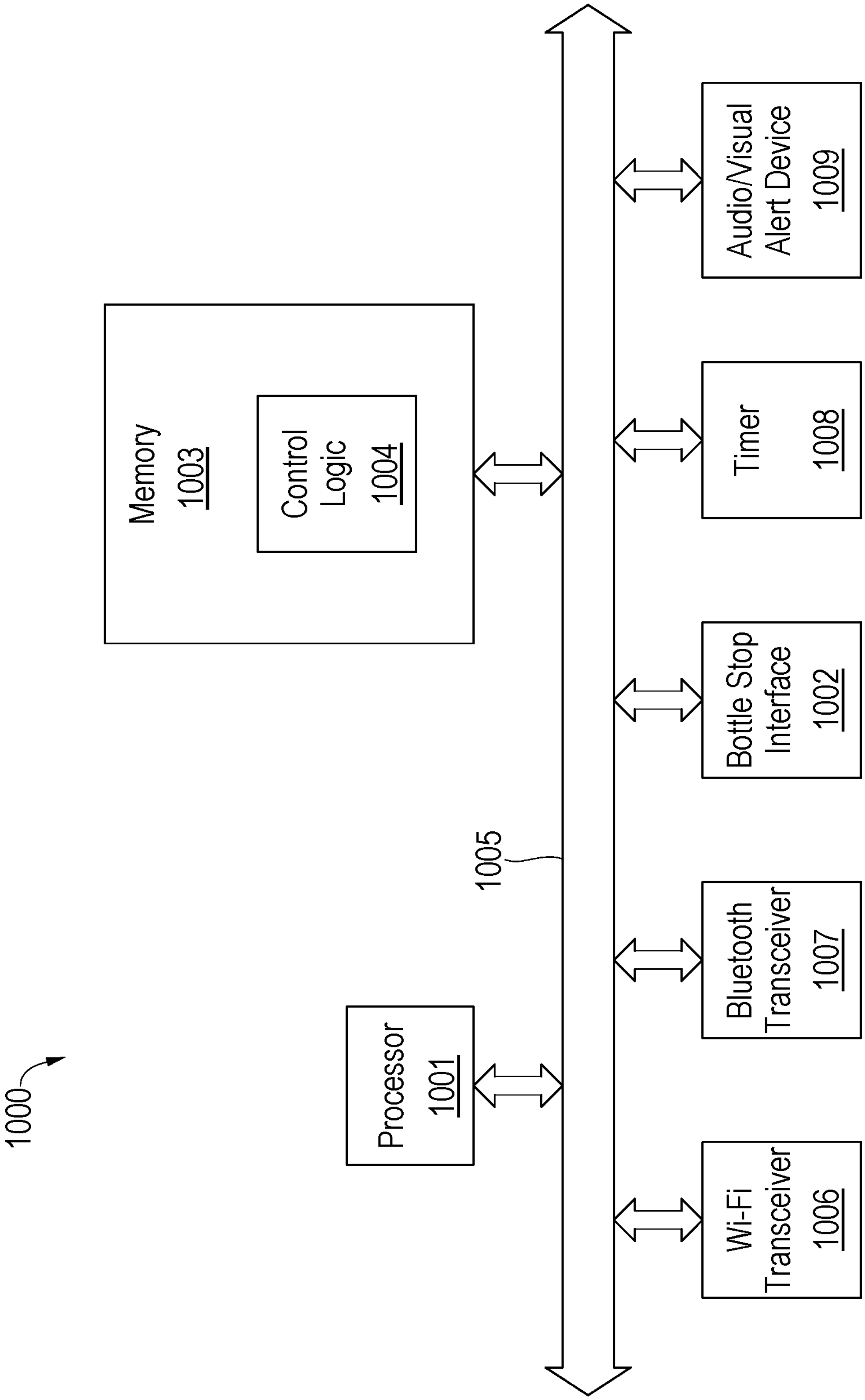
FIG. 10 is a block diagram of a controller for use in the medication dispensing system shown in FIG. 2.

FIG. 10 is a block diagram of an exemplary controller 106 in accordance with an embodiment of the present disclosure. As shown by FIG. 10, the exemplary controller 106 comprises a processing element 1001 and memory 1003.

Figure 1:
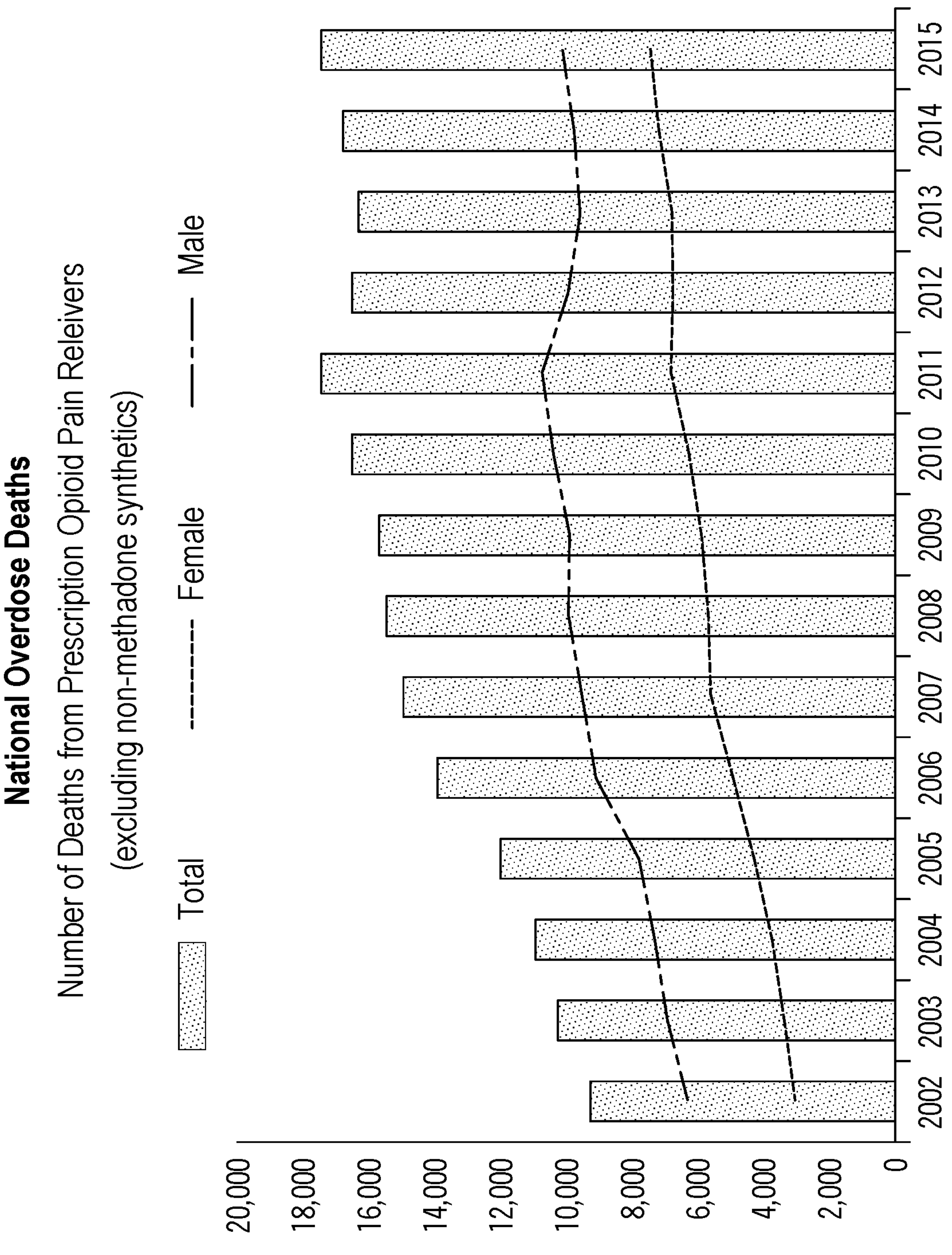
FIG. 1 is a graph describing the number of deaths from prescription opioid pain relievers.

Stored in memory 1003 is control logic 1004. The control logic 1004 is for generally controlling the medicine dispensing system 100 (FIG. 1). The control logic 1004 may be software, hardware, firmware, or a combination thereof The exemplary embodiment of the controller 106 depicted by FIG. 10 comprises the at least one conventional processing element 1001, such as a digital signal processor (DSP) or a central processing unit (CPU), that communicates to and drives the other elements within the controller 106 via a local interface 1005, which can include at least one bus. Further, the processing element 1001 is configured to execute instructions of software, such as the control logic 1004.

In operation, a timer 1008 is configured to transmit data indicative of an alert or notification to the control logic 1004 at certain periods throughout a day. For example, at 8:00 AM, the timer 1008 may transmit data indicative of a notification to alert a user to the control logic 1004 that it is time for morning medications. Upon receipt, the control logic 1004 may activate an audio and/or visual alert device 1009. Further, the control logic 1004 may transmit data indicative of the notification or alert via the Wi-Fi transceiver 1006 and/or the Bluetooth transceiver 1007. Note that the Bluetooth transceiver 1007 is configured for transmitting messages for short-range devices, whereas the Wi-Fi transceiver 1006 is configured for providing high-speed Web access or Internet.

Further, at a predetermined morning time, the controller control logic 1004 transmits a signal to a servo motor corresponding to gate 125 (FIG. 1) to actuate and open the gate 125. The gate 125 actuates, and the medicine bottle in the first row, first column falls into the trough 105 (FIG. 1). After the medicine bottle has dropped into the trough 105, the control logic 1004 transmits a signal to the servo motor corresponding to gate 125 to actuate and close the gate 125.

After gate 125 closes, the control logic 1004 transmits a signal to a servo motor corresponding to gate 121 (FIG. 1) to actuate and open the gate 121. The gate 121 actuates and opens, and the medicine bottle in the second row, first column drops to the previous position of the medicine bottle 180 in the first row, first column.

This process continues with gates 126, 122 and 127, 123, and 128, 124. That is, at predetermined times, e.g., noon, evening, and bedtime, the control logic 1004 actuates the servo motors corresponding to 126, 127, and 128. The bottles on the first row in each column falls into the trough 105 (FIG. I) at the predetermined time. Further, once the medicine bottles 180 have dropped into the trough 105, the medicine bottles 180 inhibited by gates 122, 123, and 124 fall to the previous position of its corresponding first row. Thus, the next day's medicines are ready to dispense.

Figure 11:
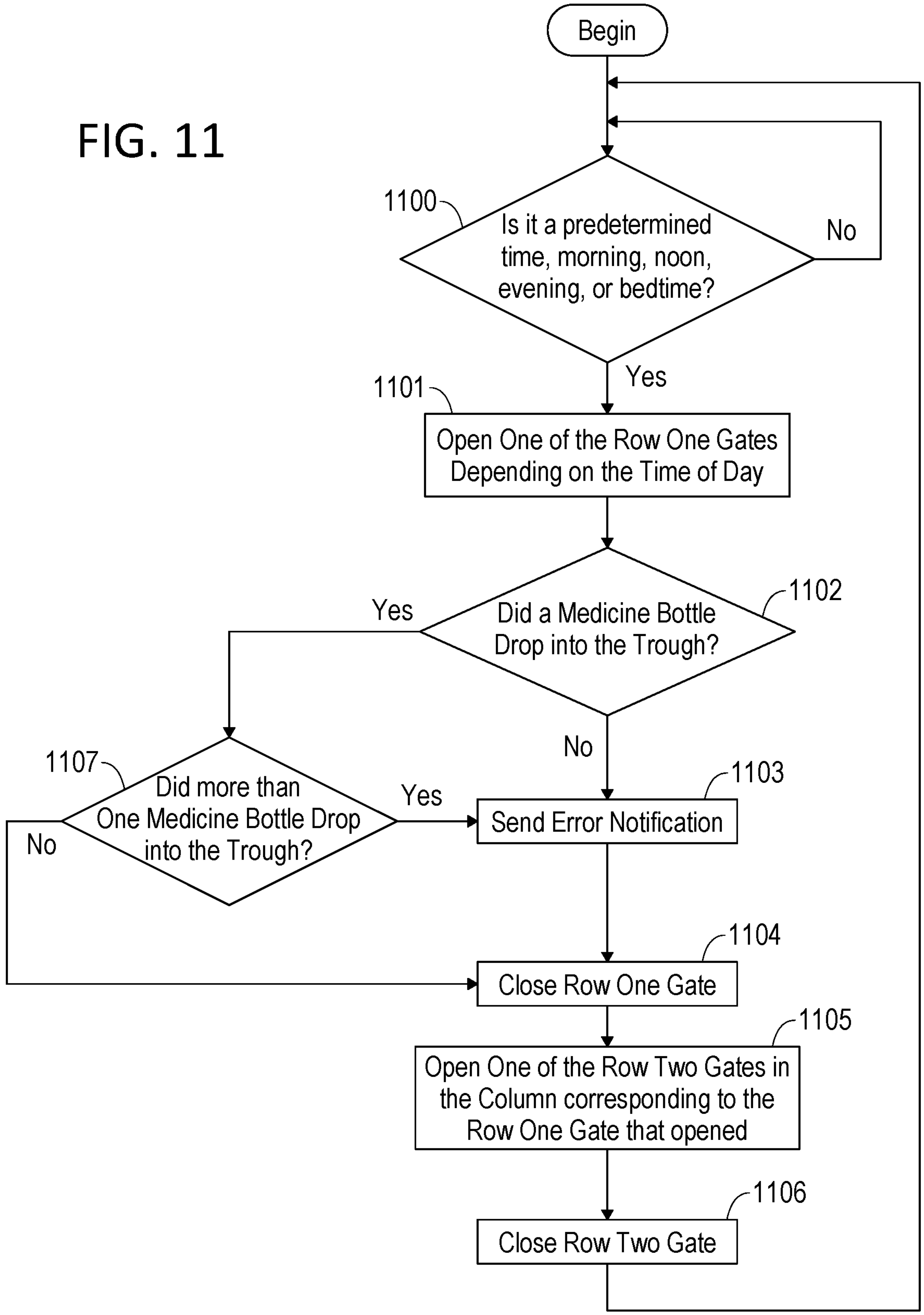
FIG. 11 is an exemplary flowchart of the architecture and functionality of the medication dispensing system shown in FIG. 2.

FIG. 11 is a flowchart depicting exemplary architecture and functionality of the medicine dispensing system 100 (FIG. 1).

In step 1100, the control logic 1004 (FIG. 10) determines if it is a predetermined time to dispense medicine bottles 180 (FIG. 1). For example, the control logic 1004 may be programmed to dispense medicine bottles in the morning, at noon, in the evening and at bedtime. That is, the control logic 1004 may be programmed to dispense medicine bottles 180 at 8:00 AM, 12:00 PM, 6:00 PM, and 9:00 PM. Note that the preprogramming may be done via the touchpad 150 (FIG. 1) or the times may be pre-programmed into the control logic 1004

If it is a predetermined time to dispense medicine bottles 180, the control logic 1004 opens one of the row one gates 125-128 (FIG. 1) depending upon the time of day. For example, if it is morning, the control logic 1004 opens the gate 125 for morning medicine bottle 180. Note that the control logic 1004 transmits a signal to a servo motor coupled to the gate 125, and the servo motor actuates the gate 125.

In step 1102, the control logic 1004 determines if a medicine bottle 180 dropped into the trough. As described herein, there is an infrared sensor 145 that transmits a signal indicating that a medicine bottle 180 dropped into the trough 105.

If the control logic 1004 determines that a medicine bottle 180 dropped into the trough 105, the control logic 1004 determines whether more than one medicine bottle dropped in the trough 105 in step 1107. As described herein, there is an infrared sensor 144 that transmits a signal indicating that more than one medicine bottle 180 dropped in the trough 105.

If more than one medicine bottle 180 dropped in the trough 105, the control logic sends an error notification via wireless fidelity (Wi-Fi) or BluetoothTM in step 1103. A device of a caregiver or of the patient may receive this error notification.

Also, in step 1102 if the control logic determines that a medicine bottle 180 did not drop in the trough 105, the control logic 1004 sends an error notification via Wi-Fi or Bluetooth1M in step 1103. A device of a caregiver or of the patient may receive this error notification.

If only one medicine bottle 180 drops in the trough 105 in steps 1102 and 1107, the control logic 1004 closes the open gate 125-128 in step 1104. In the example provided, the control logic 1004 closes gate 125.

In step 1105, the control logic 1004 opens one of the row two gates 121-124 in the column corresponding to the row one gate 125-128 that opened, such that the medicine bottle 180 being stopped by gate 121-123 falls to the position of the medicine bottle 180 that dropped in the trough 105. Thus, the medicine bottle 180 from row two drops to row one. In the example provided, the control logic 1004 opens gate 121, which corresponds to the medicine bottle 180 above the medicine bottle 180 that dropped in the trough 105. The medicine bottle 180 above the medicine bottle 180 that dropped in the trough 104 then falls to the position of the medicine bottle 180 that dropped in the trough 105 to row one.

Note that when medicine bottle 180 drops to row one, all medicine bottles 180 above that medicine bottle 180 fall to a lower row. That is, medicine bottle 180 in row three drops to row two, medicine bottle 180 in row four drops to row three, medicine bottle 180 in row five drops to row four, medicine bottle 180 in row six drops to row five, and medicine bottle 180 in row seven drops to row six.

The control logic 1004 closes the row two gate in step 1106. That is, the control logic 1004 transmits a signal to the servo motor controlling the row two gate, and the servo motor closes the gate. In the example provided, the control logic 1004 closes gate 121. Closing gate 121 ensures that the remaining medicine bottles 121 remain vertically aligned in the channel 117-120.

The invention claimed is:

1. A system, comprising:

a housing comprising at least one vertical channel for housing a plurality of medicine bottles laterally stacked in the channel, the channel having a first row gate positioned above a trough and positioned such that when open, the first row gate is beneath a first of the plurality of medicine bottles, the channel having a second row gate positioned above the first row gate and positioned such that when open, the second row gate is beneath a second of the plurality of medicine bottles, the second of the plurality of medicine bottles atop the first of the plurality of medicine bottles, the housing further comprising a trough for catching falling medicine bottles; and a processor configured for actuating the first row gate at a predetermined preprogrammed time allowing the first of the plurality of medicine bottles to fall into the trough, the processor further configured for determining if the first of the plurality of medicine bottles fell into the trough and if the first of the plurality of medicine bottles fell into the trough and actuating the second row gate allowing the second of the plurality of medicine bottles to fall into a position where the first of the plurality of medicine bottles was held before the first of the plurality of medicine bottles fell into the trough, wherein the first row gate is separately actuatable from the second row gate and the trough is positioned below the first row gate and has an upwardly angled right section and an upwardly angled left section, and on at least one of the upwardly angled sections is an infrared light and on the opposing upwardly angled section is an infrared sensor such that when the first of the plurality of medicine bottles falls into the trough, the processor detects a change in a signal transmitted by the infrared sensor and actuates the second row gate such that a second of the plurality of medicine bottles to fall into the position.

2. The system of claim 1, further comprising a controller for housing at least the processor.

3. The system of claim 2, wherein the controller is integral with the housing.

4. The system of claim 3, wherein the controller comprises a touchscreen and configured for programming the processor.

5. The system of claim 1, wherein the trough is integral with the housing.

6. The system of claim 1, wherein the first of the plurality of medicine bottles falls and lands on a flat section between and contiguous with the upwardly angled right section and the upwardly angled left section.

7. The system of claim 6, wherein the second infrared sensor transmits a signal to the processor, and based on the signal, the processor determines if more than one medicine bottle fell into the trough.

* * * * *